United States Patent
Blackburn et al.

(10) Patent No.: US 7,012,998 B1
(45) Date of Patent: Mar. 14, 2006

(54) VOICE MESSAGING PLATFORM AS AN INTELLIGENT PERIPHERAL

(75) Inventors: Connie Blackburn, Milpitas, CA (US); Joel Brand, Milpitas, CA (US); Douglas William Varney, Naperville, IL (US)

(73) Assignee: Avaya Technology Corp., Basking Ridge, NJ (US)

( * ) Notice: Subject to any disclaimer, the term of this patent is extended or adjusted under 35 U.S.C. 154(b) by 0 days.

(21) Appl. No.: 09/513,305

(22) Filed: Feb. 25, 2000

Related U.S. Application Data
(60) Provisional application No. 60/121,838, filed on Feb. 26, 1999.

(51) Int. Cl.
*H04M 1/64* (2006.01)

(52) U.S. Cl. .............................. 379/88.18; 379/88.25; 379/221.11; 379/221.14

(58) Field of Classification Search .............. 379/88.18, 379/88.22–88.25, 88.27, 88.28, 220.01, 221.08–221.12, 379/221.01–221.03, 221.14, 229, 230
See application file for complete search history.

(56) References Cited

U.S. PATENT DOCUMENTS

| | | | |
|---|---|---|---|
| 4,625,081 A | | 11/1986 | Lotito et al. |
| 5,058,152 A | | 10/1991 | Solomon et al. |
| 5,179,585 A | * | 1/1993 | MacMillan et al. ...... 379/88.01 |

(Continued)

FOREIGN PATENT DOCUMENTS

| | | |
|---|---|---|
| EP | 0 481 683 A2 | 4/1992 |
| EP | 0543235 A2 | 5/1993 |
| EP | 0 679 005 A1 | 10/1995 |
| EP | 0 856 979 A2 | 8/1998 |
| EP | 0905959 A2 | 3/1999 |
| GB | 2 252 014 A | 7/1992 |
| JP | 10079785 | 3/1998 |
| WO | WO 98/09421 | 3/1998 |
| WO | WO 98/09422 | 3/1998 |
| WO | WO 98/11704 | 3/1998 |
| WO | WO 99/29083 | 6/1999 |

OTHER PUBLICATIONS

Chung–Hsien Wu, et al., "Speech Activated Telephony Email Reader (SATER) Based on Speaker Verification and Text–To–Speech Conversion", Institute of Information Engineering, IEEE Transactions on Consumer Electronics, vol. 43, No. 3, Aug. 1997, pp. 707–716.

(Continued)

*Primary Examiner*—Roland G Foster
(74) *Attorney, Agent, or Firm*—Haverstock & Owens LLP

(57) ABSTRACT

A voice messaging platform utilizes resources from remote intelligent peripherals within the network system. The voice messaging platform preferably includes a voice mail module, an internal controller, and an internal storage device. Preferably, the voice mail module allows the voice messaging platform to provide a full feature voice mail system for the users wherein the voice mail module is configured to store incoming messages, play stored messages, play outgoing messages, place outgoing calls, and the like. The internal controller preferably directs the voice messaging platform to detect different types of resources available to the voice messaging platform from the remote intelligent peripherals. Further, the internal controller also directs the voice messaging platform to find addresses corresponding to each of the remote intelligent peripherals within the network system. Preferably, the internal storage device stores the type of resource vailable from the remote intelligent peripherals and their respective addresses.

27 Claims, 2 Drawing Sheets

U.S. PATENT DOCUMENTS

| | | | |
|---|---|---|---|
| 5,339,352 A | | 8/1994 | Armstrong et al. |
| 5,406,616 A | | 4/1995 | Bjorndahl |
| 5,471,521 A | * | 11/1995 | Minakami et al. ........ 379/88.18 |
| 5,479,489 A | | 12/1995 | O'Brien |
| 5,487,111 A | | 1/1996 | Slusky |
| 5,524,147 A | | 6/1996 | Bean |
| 5,537,464 A | | 7/1996 | Lewis et al. |
| 5,539,807 A | | 7/1996 | Ghisler et al. |
| 5,572,579 A | | 11/1996 | Orriss et al. |
| 5,577,110 A | | 11/1996 | Aquino |
| 5,583,920 A | | 12/1996 | Wheeler, Jr. |
| 5,596,573 A | | 1/1997 | Bertland |
| 5,625,682 A | | 4/1997 | Gray et al. |
| 5,668,863 A | | 9/1997 | Bieselin et al. |
| 5,712,903 A | | 1/1998 | Bartholomew et al. |
| 5,732,216 A | | 3/1998 | Logan et al. |
| 5,737,725 A | | 4/1998 | Case |
| 5,742,905 A | | 4/1998 | Pepe et al. |
| 5,764,746 A | | 6/1998 | Reichelt |
| 5,838,768 A | * | 11/1998 | Sumar et al. ............ 379/88.14 |
| 5,850,629 A | | 12/1998 | Holm et al. |
| 5,896,441 A | | 4/1999 | Akazawa et al. |
| 5,912,961 A | * | 6/1999 | Taylor et al. ........... 379/221.11 |
| 5,922,045 A | | 7/1999 | Hanson |
| 5,949,776 A | | 9/1999 | Mahany et al. |
| 5,970,133 A | | 10/1999 | Salimando |
| 5,995,613 A | | 11/1999 | Goel et al. |
| 6,016,336 A | | 1/2000 | Hanson |
| 6,061,432 A | | 5/2000 | Wallace et al. |
| 6,078,655 A | | 6/2000 | Fahrer et al. |
| 6,084,892 A | | 7/2000 | Benash et al. |
| 6,161,087 A | | 12/2000 | Wightman et al. |
| 6,163,535 A | * | 12/2000 | Jordan et al. ............... 370/352 |
| 6,163,855 A | | 12/2000 | Shrivastava et al. |
| 6,167,119 A | * | 12/2000 | Bartholomew et al. .. 379/88.04 |
| 6,185,288 B1 | | 2/2001 | Wong |
| 6,199,076 B1 | | 3/2001 | Logan et al. |
| 6,226,289 B1 | | 5/2001 | Williams |
| 6,229,880 B1 | * | 5/2001 | Reformato et al. ...... 379/88.01 |
| 6,233,234 B1 | | 5/2001 | Curry et al. |
| 6,233,315 B1 | * | 5/2001 | Reformato et al. ...... 379/88.01 |
| 6,260,067 B1 | * | 7/2001 | Barnhouse et al. ......... 709/224 |
| 6,282,270 B1 | | 8/2001 | Porter |
| 6,289,090 B1 | | 9/2001 | Tessler et al. |
| 6,289,212 B1 | | 9/2001 | Stein et al. |
| 6,304,645 B1 | * | 10/2001 | Holland et al. ............. 379/157 |
| 6,317,484 B1 | * | 11/2001 | McAllister ............... 379/88.02 |
| 6,330,308 B1 | * | 12/2001 | Cheston et al. .......... 379/88.04 |
| 6,381,325 B1 | | 4/2002 | Hanson |
| 6,389,126 B1 | * | 5/2002 | Bjornberg et al. ..... 379/201.03 |
| 6,400,804 B1 | | 6/2002 | Bilder |
| 6,424,647 B1 | | 7/2002 | Ng et al. |
| 6,427,002 B1 | * | 7/2002 | Campbell et al. ........ 379/88.01 |
| 6,442,169 B1 | | 8/2002 | Lewis |
| 6,456,700 B1 | | 9/2002 | Malik |
| 6,493,438 B1 | | 12/2002 | Gross et al. |
| 6,650,737 B1 | | 11/2003 | Finnigan |
| 2004/0005046 A1 | * | 1/2004 | Deo et al. .............. 379/220.01 |

OTHER PUBLICATIONS

Cristina Delogu, et al., "Spectral Analysis of Synthetic Speech and Natural Speech with Noise Over the Telephone Line", Istituto Superiore Poste e Telecommunicazioni, v.le Europa 190, 00144 Roma, p. 1409–1412.

Masanobu Abe, et al. "A New Framework to Produce Multimedia Content by Combining Synthesized Speech and Moving Pictures in the WWW Environment", NTT Cyber Space Labs, Japan, 1999, pp. 611–616.

T. Yoshida, N. Terashima, "A Conceptual Study of a Voice Conversation Facility in Intelligent NW Voice Mail," May 27–Jun. 1, p. 129–136, Stockholm, Sweden.

Deixler, Lyle, "Iwatsu's New ADIX–S, This starter phone system can grow with your company", Mar. 1997, p. 44–45, Teleconnect, vol. 15, Issue 3.

* cited by examiner

VOICE MESSAGING PLATFORM AS AN INTELLIGENT PERIPHERAL

RELATED APPLICATIONS

This application claims priority under 35 U.S.C. § 119(e) of the co-pending U.S. provisional application Ser. No. 60/121,838 filed on Feb. 26, 1999 and entitled "Voice Messaging Platform as an Intelligent Peripheral". The provisional application Ser. No. 60/121,838 filed on Feb. 26, 1999 and entitled "Voice Messaging Platform as an Intelligent Peripheral" is also hereby incorporated by reference.

FIELD OF THE INVENTION

This invention relates to the field of telecommunications systems. More particularly, this invention relates to the field of voice messaging platforms within telecommunications systems employing intelligent peripherals.

BACKGROUND OF THE INVENTION

In the past, services which were integrated with a voice messaging platform needed to be implemented on the voice messaging platform. For example, these services include billing the call to a remote location, switching functionality such as placing additional calls or conferencing calls together, call screening, querying subscriber information such as access level and functionality, translating numbering plans for number portability, querying real time subscriber status for call completion, and the like. The typical voice messaging platform would need to be individually upgraded to accommodate these above mentioned services. To be properly upgraded to implement these new services, the voice messaging platform usually required additional network interfaces, additional network ports, additional switching functionality, and additional subscriber data.

Currently, subscribers to voice messaging systems have become more sophisticated in their voice messaging use and require improved services and additional features. As the demands for more sophisticated services grow, service providers will continue to implement new additional services. However, to implement new services throughout a given service area, prior art systems require substantial modifications to every voice messaging platform within this given service area. For example, to add the feature of call screening within a given area, every voice messaging platform within this given area needs to be modified by adding network interfaces, utilizing additional network ports, providing switching functionality, adding additional subscriber data, and the like. Modifying each voice messaging platform to implement each new feature is a time-consuming task which increases the costs of providing new services and delays introduction of additional functionality related to these new services.

What is needed a voice messaging platform that is capable of adding new services without physically modifying the voice messaging platform. What is needed is a voice messaging platform which functions as an intelligent peripheral within an intelligent network. What is further needed is a voice messaging platform which is capable of utilizing resources of other intelligent peripherals.

SUMMARY OF THE INVENTION

The present invention is a voice messaging platform that utilizes resources from remote intelligent peripherals within the network system. The voice messaging platform preferably includes a voice mail module, an internal controller, and an internal storage device. Preferably, the voice mail module allows the voice messaging platform to provide a full feature voice mail system for the users wherein the voice mail module is configured to store incoming messages, play stored messages, play outgoing messages, place outgoing calls, and the like. The internal controller preferably directs the voice messaging platform to detect different types of resources available to the voice messaging platform from the remote intelligent peripherals. Further, the internal controller also directs the voice messaging platform to find addresses corresponding to each of the remote intelligent peripherals within the network system. Preferably, the internal storage device stores the type of resource available from the remote intelligent peripherals and their respective addresses.

By locating and utilizing resources from remote intelligent peripherals, the voice messaging platform is capable of incorporating additional features by merely introducing remote intelligent peripherals that provide functionality for these additional features. The voice messaging platform does not need to be modified to introduce additional features for users. Preferably, additional features are capable of being added to a service area without changing or modifying every voice messaging platform within this service area. As a result, the voice messaging platform improves scalability within the network system.

The present invention provides a voice messaging platform which locates and utilizes resources from remote intelligent peripherals. Additionally, the present invention provides a voice messaging platform which introduces additional features by modifying and/or adding remote intelligent peripherals that provide functionality for these additional features.

DETAILED DESCRIPTION OF THE PREFERRED EMBODIMENT OF THE PRESENT INVENTION

Figure 1:
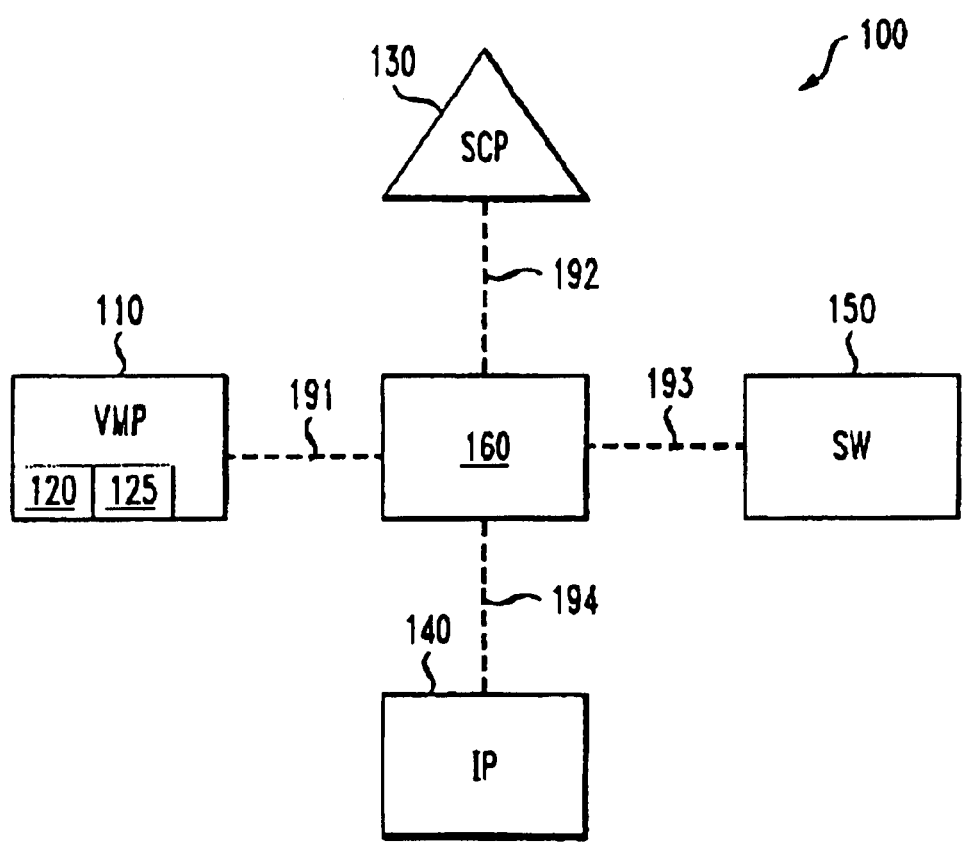
FIG. 1 illustrates a block diagram showing a telecommunications system configured for implementing a preferred embodiment of the present invention.

FIG. 1 illustrates a block diagram showing an Intelligent Network system 100 configured for implementing a preferred embodiment of the present invention. The present invention is a voice messaging platform 110 that utilizes resources belonging to remote intelligent peripherals. This voice messaging platform 110 is preferably configured to detect types of resources available from remote intelligent peripherals and also their respective locations within the Intelligent Network system 100. Further, the voice messaging platform 110 also preferably stores the type of resource available from the remote intelligent peripherals and their respective locations.

The Intelligent Network system 100 is shown for exemplary purposes only. It will be apparent to those skilled in the art to modify, substitute delete or add elements to the Intelligent Network system 100 without departing from the scope of the present invention.

The Intelligent Network system 100 preferably includes a voice messaging platform 110, an internal controller 120, an internal storage device 125, a signal control point (SCP)

130, an intelligent peripheral 140, a switch 50, a signaling system No. 7 (SS7) network 160, and control links 191, 192, 193, and 194.

In this preferred embodiment, the voice messaging platform 110 is preferably a full featured voice messaging system which is configured to store incoming messages, play stored messages, play outgoing messages, place outgoing calls, and the like. The intelligent peripheral 140 can include functions such as call forwarding, call billing, call screening, number portability, switching services, and the like.

The internal controller 120 is located within the voice messaging platform 110. The internal controller 120 is a logical element and its physical location can be within the voice messaging platform 110 or remote. This internal controller 120 is preferably configured to allow the voice messaging platform 110 to communicate with other intelligent peripherals. Preferably, the internal controller 120 allows the voice messaging platform 120 to act as an intelligent peripheral and also allows the voice messaging platform 110 to utilize resources provided by other intelligent peripherals and/or switches within the Intelligent Network 100.

The internal storage device 125 is preferably coupled to the internal controller 120. Preferably, the internal storage device 125 is configured to store data records requested by the internal controller 120 and configured to recall these stored data records for the internal controller 120. As stated before, the Intelligent Network 100 is shown for exemplary purposes only. It will be apparent to those skilled in the art to add or delete intelligent peripheral devices, switches, and signal control points.

The SCP 140 preferably provides control signals to and from the voice messaging platform 110, the switch 150, and the intelligent peripheral 140, via the SS7 network 160. The voice messaging platform 110 is coupled to the SS7 network 160 via the control link 191. The SCP 130 is coupled to the SS7 network 160 via the control link 192. The intelligent peripheral 140 is coupled to the SS7 network 160 via the control link 194. The switch 150 is coupled to the SS7 network 160 via the control link 193. It would be apparent to those skilled in the art to utilize additional or fewer control links.

Figure 2:
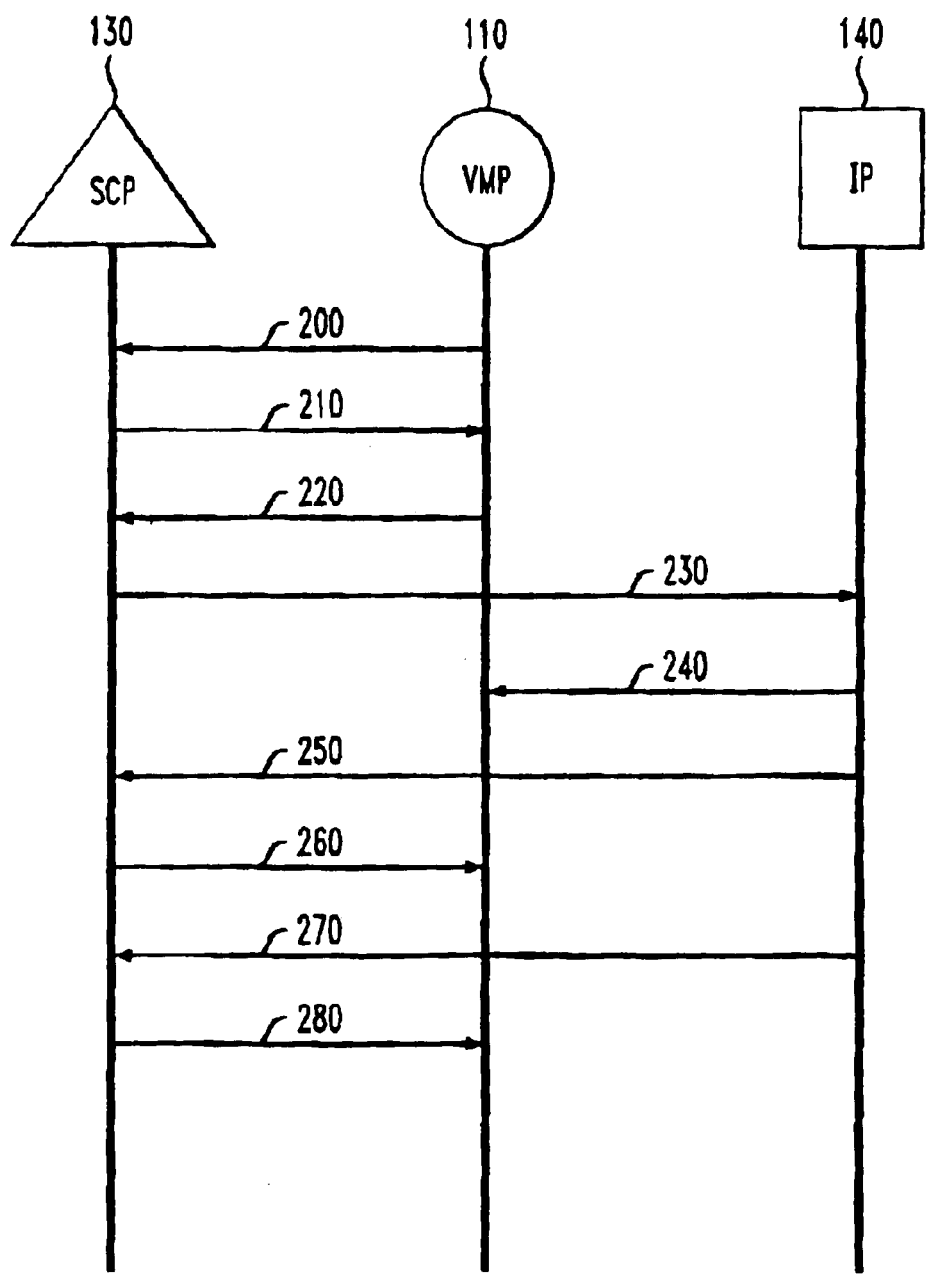
FIG. 2 illustrates a diagram showing a sample operation of the present invention interacting while utilizing a voice messaging system.

FIG. 2 illustrates a timing diagram for describing the operation of the preferred embodiment of the present invention. For the sake of simplicity and clarity, common elements shown in both FIGS. 1 and 2 also share common reference numerals. For example, the SCP 130, the voice messaging platform 110, and the intelligent peripheral 140 are common in both FIGS. 1 and 2. To prevent obscuring the preferred embodiment of the present invention, selected details are omitted in FIG. 2 such as control links between the SCP 130, the voice messaging platform 110, and the intelligent peripheral 140 which are specifically shown in FIG. 1 and described above.

In this timing diagram, the voice messaging platform 110 in conjunction with the internal controller 120 and the internal storage device 125 are described in context with the overall functionality of the Intelligent Network 100 (FIG. 1). As shown in FIG. 2, this timing diagram illustrates interaction between the SCP 130, the voice messaging platform 110, the internal controller 120, the internal storage device 125, and the intelligent peripheral 140. According to the preferred embodiment the voice messaging platform 110 is configured to utilize resources from the intelligent peripheral 140. However, it will be apparent to those skilled in the art that the voice messaging platform 110 is also configured to utilize resources from other sources within an Intelligent Network such as a switch, a signal control point, and the like.

First, this timing diagram begins with an initiation sequence at start up which is shown in detain in the steps 200–210 shown in detail below. This initiation sequence preferably begins with the voice messaging platform 110. At the step 200, the internal controller 120 preferably directs the voice messaging platform 110 to query the SCP 130 for information pertaining to the Intelligent Network 100. At the step 210, the SCP 130 preferably responds by delivering this requested information to the voice messaging platform 110. Upon receipt, the voice messaging platform 110 preferably stores this requested information in the internal storage device 125. This initiation sequence of the steps 200–210 is not required to be performed for the voice messaging platform 110 to share resources with other intelligent peripherals and/or switches. However, periodic performance of this initiation sequence to update information relating to the Intelligent Network 100 is preferable.

As stated before, the voice messaging platform 110 is capable of performing various functions such as message storage, message retrieval, message reply, and the like. During the course of interaction and if the voice messaging platform 110 determines that resources outside the voice messaging platform 110 are needed, the internal controller 120 directs the voice messaging platform 110 to contact the SCP 130 in the step 220. In response to the step 220, the SCP 130 preferably identifies an appropriate outside resource to utilize. In the preferred embodiment, this appropriate outside resource is preferably an intelligent peripheral such as the intelligent peripheral 140. However, it will be apparent to those skilled in the art to substitute switches and other devices for an intelligent peripheral. Next, at the step 230, the SCP 130 contacts this appropriate outside resource which in the preferred embodiment is the intelligent peripheral 140. Preferably, the intelligent peripheral 140 then calls the voice messaging platform 110 in the step 240.

During the course of the call between the intelligent peripheral 140 and the voice messaging platform 110, the intelligent peripheral 140 preferably updates the SCP 130 regarding the status of this call as shown in the step 250. During this call, the SCP 130 preferably determines the routing of this call between the intelligent peripheral 140 and the voice messaging platform 10. Preferably, at the step 260, the SCP 130 continuously informs the voice messaging platform 110 of a current status of the call. When the call from the intelligent peripheral 140 to the voice messaging platform 110 is completed, the intelligent peripheral preferably communicates to the SCP'130 that the call is now terminated as shown in the step 270. Next at the step 280, the SCP 130 updates the voice messaging platform 110 on current call information and the voice messaging platform 110 is capable of directing further interaction.

Returning back to FIG. 1, the internal controller 120 preferably directs the voice messaging platform 110 to detect different types of resources available to the voice messaging platform 110 from the remote intelligent peripheral 140. Further, the internal controller 120 also directs the voice messaging platform 110 to find an address corresponding to the remote intelligent peripheral 140. Preferably, the internal storage device 125 stores the type of resource available from the remote intelligent peripheral 140 and the associated address.

By locating and utilizing resources from the intelligent peripheral 140, the voice messaging platform 110 is capable of incorporating additional features by merely introducing new intelligent peripherals (not shown) that provide functionality for these additional features. It will be apparent that additional features can be utilized from any intelligent peripheral. The voice messaging platform 110 does not need to be modified to introduce additional features for users. For example, to add new features, the voice messaging platform 110 does not require modification of adding new network interfaces, utilizing additional network ports, providing additional switching functionality, adding additional subscriber data, and the like. Preferably, additional features are capable of being added to a service area without changing or modifying every voice messaging platform within this service area. As a result, the voice messaging platform improves scalability within the network system. As a result of the voice messaging platform 110, costs for introducing additional features and/or upgrading existing features decrease, and time required to introduce additional features and/or perform upgrades for existing features also decrease.

The present invention has been described in terms of specific embodiments incorporating details to facilitate the understanding of the principles of construction and operation of the invention. Such reference herein to specific embodiments and details thereof is not intended to limit the scope of the claims appended hereto. It will be apparent to those skilled in the art that modifications may be made in the embodiments chosen for illustration without departing from the spirit and scope of the invention.

Specifically, it will be apparent to one of ordinary skill in the art that the voice messaging platform of the present invention could be implemented in several different ways and the voice messaging platform and method disclosed above is only illustrative of several embodiments of the invention and is in no way a limitation.

What is claimed is:

1. A voice messaging platform for utilizing resources of a remote intelligent peripheral, the voice messaging platform comprising:
   a. a voice messaging module configured to store and retrieve a voice message; and
   b. an internal controller coupled to the voice messaging module and configured to identify an address of a remote intelligent peripheral corresponding to a desired function, to send a request for communication to a control point wherein the request includes the identified address, and to receive a communication from the remote intelligent peripheral in response to the control point signaling the remote intelligent peripheral corresponding to the identified address, such that the communication from the remote intelligent enables the voice messaging system to utilize the desired function provided by the intelligent peripheral.

2. The voice messaging platform according to claim 1 further comprising an internal storage device coupled to the internal controller for storing the address and the function of the remote intelligent peripheral.

3. A voice messaging system for sharing resources within a network, comprising:
   a. a control point;
   b. a remote intelligent peripheral; and
   c. a voice messaging platform coupled to the remote intelligent peripheral and the control point via the network such that in operation the voice messaging platform matches a desired function to the remote intelligent peripheral, retrieves an address of the remote intelligent peripheral, and send a request for communication to the control point wherein the request includes the identified address, the control point signals the remote intelligent peripheral at the identified address, and the remote intelligent peripheral contacts the voice messaging platform such that the desired function provided by the intelligent peripheral is utilized by the voice messaging platform.

4. The voice messaging system according to claim 3 wherein the voice messaging platform comprises an internal storage device coupled to an internal controller for storing the address and the function of the remote intelligent peripheral.

5. A method of utilizing resources contained within a remote intelligent peripheral by a voice messaging system, the method comprising the following steps:
   a. requesting a desired function via the voice messaging system;
   b. matching the desired function with the remote intelligent peripheral;
   c. retrieving an address of the intelligent peripheral;
   d. signaling the intelligent peripheral at the address; and
   e. the intelligent peripheral contacting the voice messaging system such that the desired function provided by the intelligent peripheral is utilized by the voice messaging system.

6. The method according to claim 5 further comprising receiving the resources into the voice messaging system.

7. The method according to claim 5 wherein the voice messaging system comprises an internal controller located within the voice messaging system and coupled to the intelligent peripheral.

8. The method according to claim 7, wherein the voice messaging system and the intelligent peripheral are coupled between a network having an SS7 protocol.

9. The method according to claim 5 further comprising retrieving a plurality of addresses wherein each of the plurality of addresses corresponds to one of a plurality of intelligent peripherals, and each one of the plurality of intelligent peripherals includes a function available for use by the voice messaging system.

10. The method according to claim 9 further comprising retrieving a functional description of the intelligent peripheral corresponding to the available function.

11. The method according to claim 10 further comprising storing the address and the functional description associated with the intelligent peripheral within a database.

12. A method of utilizing resources contained within a plurality of remote intelligent peripherals by a voice messaging system, the method comprising the following steps:
   a. via the voice messaging system selecting a desired function from a plurality of functions available to the voice messaging system, wherein each intelligent peripheral within the plurality of intelligent peripherals corresponds to at least one of the available functions;
   b. matching the desired function with an appropriate one of the plurality of intelligent peripherals; and
   c. querying the appropriate one of the plurality of intelligent peripherals in response to the desired function.

13. The method according to claim 12 further comprising receiving the resources associated with the appropriate one of the plurality of intelligent peripherals by the voice messaging system.

14. The method according to claim 12 wherein the voice messaging system comprises an internal controller located within the voice messaging system and coupled to the plurality of intelligent peripherals.

15. The method according to claim 14 wherein the voice messaging system and the plurality of intelligent peripherals are coupled between a network having an SS7 protocol.

16. The method according to claim 12 further comprising retrieving a plurality of addresses wherein each of the plurality of addresses corresponds to one of the plurality of intelligent peripherals.

17. The method according to claim 16 further comprising retrieving a plurality of functional descriptions wherein each of the plurality of functional descriptions corresponds to one of the available functions and each of the plurality of functional descriptions is associated with one of the plurality of intelligent peripherals.

18. The method according to claim 17 further comprising storing the plurality of addresses and the plurality of functional descriptions associated with the plurality of intelligent peripherals within a database.

19. The method according to claim 12 wherein the plurality of functions includes a plurality of different functions.

20. A voice messaging platform for utilizing resources included within a plurality of remote intelligent peripherals, the voice messaging platform comprising:
   a. a voice messaging module configured to store and retrieve a voice message; and
   b. an internal controller coupled to the voice messaging module and configured to select a desired function from a plurality of functions available to the voice messaging platform, wherein each intelligent peripheral within the plurality of intelligent peripherals corresponds to at least one of the available functions, further wherein the desired function is matched with an appropriate one of the plurality of intelligent peripherals, and the appropriate one of the plurality of intelligent peripherals is queried in response to the desired function.

21. The voice messaging system according to claim 20 wherein the voice messaging platform receives the resources associated with the appropriate one of the plurality of intelligent peripherals.

22. The voice messaging platform according to claim 20 further comprising an internal storage device coupled to the internal controller for storing the address and the function of the remote intelligent peripheral.

23. The method according to claim 20 wherein the plurality of functions includes a plurality of different functions.

24. The method of claim 5 further comprising:
   f. upgrading the remote intelligent peripheral with additional functionality;
   g. detecting the additional functionality by the voice messaging system; and
   h. utilizing the additional functionality by the voice messaging system.

25. The method of claim 5 further comprising:
   f. adding an additional remote intelligent peripheral to a network coupled to the voice messaging system, the additional remote intelligent peripheral includes at least one function usable by the voice messaging system;
   g. detecting the additional functionality by the voice messaging system; and
   h. utilizing the additional functionality by the voice messaging system.

26. The method of claim 12 further comprising:
   f. upgrading one or more of the remote intelligent peripheral with additional functionality;
   g. detecting the additional functionality by the voice messaging system; and
   h. utilizing the additional functionality by the voice messaging system.

27. The method of claim 5 further comprising:
   f. adding one or more additional remote intelligent peripheral to the plurality of remote intelligent peripherals, each of the one or more additional remote intelligent peripheral includes at least one function usable by the voice messaging system;
   g. detecting the additional functionality by the voice messaging system; and
   h. utilizing the additional functionality by the voice messaging system.

* * * * *

UNITED STATES PATENT AND TRADEMARK OFFICE
CERTIFICATE OF CORRECTION

| | |
|---|---|
| PATENT NO. | : 7,012,998 B1 |
| APPLICATION NO. | : 09/513305 |
| DATED | : March 14, 2006 |
| INVENTOR(S) | : Connie Blackburn, Joel Brand and Douglas William Varney |

It is certified that error appears in the above-identified patent and that said Letters Patent is hereby corrected as shown below:

Insert Title page Item [56]
IN THE REFERENCES CITED - U.S. PATENT DOCUMENTS - p. 2

Add –6,535,586 B1   3/2003   Cloutier et al.–

Add –2002/0087643 A1   7/2002   Parsons et al.–

Signed and Sealed this

Twenty-second Day of August, 2006

JON W. DUDAS
*Director of the United States Patent and Trademark Office*